US012638140B2

(12) United States Patent
Mcmillan et al.

(10) Patent No.: US 12,638,140 B2
(45) Date of Patent: May 26, 2026

(54) SYSTEM AND METHOD FOR IDENTIFYING A PIPE

(71) Applicant: PULS8 LTD, Aberdeen (GB)

(72) Inventors: Paul James Mcmillan, Aberdeen (GB);
Bruce Ian Harrold, Aberdeen (GB)

(73) Assignee: PULS8 LTD., Aberdeen (GB)

( * ) Notice: Subject to any disclaimer, the term of this
patent is extended or adjusted under 35
U.S.C. 154(b) by 286 days.

(21) Appl. No.: 18/002,436

(22) PCT Filed: Jun. 18, 2021

(86) PCT No.: PCT/GB2021/051558
§ 371 (c)(1),
(2) Date: Dec. 19, 2022

(87) PCT Pub. No.: WO2021/255478
PCT Pub. Date: Dec. 23, 2021

(65) Prior Publication Data
US 2023/0228385 A1 Jul. 20, 2023

(30) Foreign Application Priority Data

Jun. 19, 2020 (GB) ...................................... 2009384

(51) Int. Cl.
*F17D 5/06* (2006.01)
(52) U.S. Cl.
CPC ............ *F17D 5/06* (2013.01); *F16L 2201/60* (2013.01)
(58) Field of Classification Search
CPC ..... F17D 5/06; F16L 2201/60; F16L 2101/30; G01N 29/11; G01N 17/00; G01N 29/12; G01N 29/348
See application file for complete search history.

(56) References Cited

U.S. PATENT DOCUMENTS 5,553,498 A 9/1996 Zelczer et al.
8,903,558 B2 * 12/2014 Jarrell ...................... F17D 5/06
700/282

(Continued)

FOREIGN PATENT DOCUMENTS

CN 202166745 U 3/2012
CN 108490565 A 9/2018

(Continued)

OTHER PUBLICATIONS

Machine translation of WO 2008/023404 A1 (Year: 2008).*

(Continued)

*Primary Examiner* — Stephen D Meier
*Assistant Examiner* — Quang X Nguyen
(74) *Attorney, Agent, or Firm* — CONLEY ROSE, P.C.

(57) ABSTRACT

A system (10; 110; 210; 510) for identifying a pipe and/or associated component parts of a piping system, comprises a vibration generation arrangement (12, 112, 212, 312, 512) configured for engagement with, for coupling to and/or operatively associated with a first pipe section (P1) and a vibration detection arrangement (14; 514) configured for engagement with, for coupling to and/or operatively associated with a second pipe section (P2; P3; P4). The vibration generation arrangement (12, 112, 212, 312, 512) is configured to generate a vibration in the first pipe section (P1), which forms an identification signal propagating along the pipe. The vibration detection arrangement (14; 514) is configured to detect vibration in the second pipe section (P2; P3; P4) and thus identify whether the second pipe section (P2; P3; P4) and the first pipe section (P1) form part of the same pipe or pipe assembly.

22 Claims, 9 Drawing Sheets

(56) References Cited

U.S. PATENT DOCUMENTS

| | | | | |
|---|---|---|---|---|
| 9,983,092 | B2 * | 5/2018 | Howitt | E03B 7/071 |
| 2010/0300349 | A1 | 12/2010 | Osmun et al. | |
| 2010/0324839 | A1 | 12/2010 | Martin | |
| 2012/0279599 | A1 * | 11/2012 | Gluskin | G01N 17/00 |
| | | | | 702/58 |
| 2013/0030577 | A1 | 1/2013 | Jarrell et al. | |
| 2021/0293598 | A1 | 9/2021 | Mahalingam et al. | |
| 2023/0228385 | A1 | 7/2023 | McMillan et al. | |

FOREIGN PATENT DOCUMENTS

| | | | |
|---|---|---|---|
| CN | 112362304 | A | 2/2021 |
| CN | 114062974 | A | 2/2022 |
| EP | 2947420 | A1 | 11/2015 |
| EP | 1673880 | B1 | 10/2017 |
| JP | H07146218 | A | 6/1995 |
| JP | 2002365371 | A | 12/2002 |
| JP | 2005106288 | A | 4/2005 |
| JP | 2010074938 | A | 4/2010 |
| JP | 4641909 | B2 | 3/2011 |
| JP | 2019066322 | A | 4/2019 |
| KR | 101923498 | B1 | 2/2019 |
| WO | 92/09847 | A1 | 6/1992 |
| WO | 2008023404 | A1 | 2/2008 |
| WO | 2017134849 | A1 | 8/2017 |
| WO | 2021255478 | A1 | 12/2021 |

OTHER PUBLICATIONS

Combined Search and Examination Report for Corresponding Application Serial No. GB2009384.5, Dated Nov. 5, 2020, pp. 1-8.
International Search Report for Corresponding Application Serial No. PCT/GB2021/051558, Dated Sep. 24, 2021, pp. 1-12.
PCT/EP2024/079976 International Search Report and Written Opinion dated Jan. 17, 2025 (26 p.).
Combined Search and Examination Report dated Mar. 1, 2024 for GB Application No. GB2316179.7 (8 p.).
Combined Search and Examination Report dated Apr. 13, 2023 for GB Application No. 2215150.0 (9 p.).
PCT/GB2023/052656 International Search Report and Written Opinion dated Mar. 18, 2024 (18 p.).

\* cited by examiner

154

684

688

616

680

686

SYSTEM AND METHOD FOR IDENTIFYING A PIPE

RELATED APPLICATIONS

The present invention is a U.S. National Stage under 35 USC 371 patent application, claiming priority to Serial No. PCT/GB2021/051558, filed on 18 Jun. 2021 which claims priority to GB patent application no. 2009384.5, filed 19 Jun. 2020; the entirety of each of which is incorporated herein by reference.

FIELD

This relates to a system and method for identifying a pipe and/or associated component parts of a piping system, in particular to facilitate repair, maintenance and/or replacement.

BACKGROUND

Pipes are used in a vast array of applications to transport fluid, e.g. liquid or gas, over distance and are provided in a wide variety of sizes and construction.

In a domestic environment, for example, pipes are typically used to transport hot and cold water through the home to supply taps, baths, showers, domestic appliances and/or as part of a heating or cooling system for the home. In industrial environments, pipes (typically in the form of pipelines) may be used to transport all manner of products, including hydrocarbons, gasses, chemicals, water, steam, food, and/or beverages.

In both domestic and industrial environments, repair and/or replacement of sections of pipe is often necessary to maintain pipes and pipe networks in good working condition. In industrial environments, pipes are typically subject to regular inspection and maintenance regimes.

However, inspection and maintenance of sections of pipe can often be difficult. For example, it is commonplace in both domestic and industrial environments for several pipes to be located in close proximity and to follow complex and overlapping pathways which pass through walls and/or floors from one end to another. Sections of pipe may also be located at height or other relatively inaccessible locations.

Correct identification of a given pipe to be worked on, repaired or replaced is labour intensive and time consuming, in particular in industrial environments where a given facility may contain thousands of pipes. In the case of an offshore installation such an oil and/or gas platform, for example, deck space is at a premium and access by personnel to particular areas of the installation may be restricted for operational and/or safety reasons. This limits the ability to perform inspection and maintenance regimes efficiently.

In environments where pipes are located at height, access to a given pipe may require additional equipment such as scaffolding, ladders and the like to obtain access. Such equipment may require specialist personnel and must be constructed and used in conformance with regulatory health and safety regimes. In the case of an offshore installation such as an oil and/or gas platform, for example such specialist equipment may not be immediately available, again limiting the ability to perform inspection and maintenance regimes in an efficient manner.

The above factors increase the likelihood that the wrong pipe will be worked on or cut, with significant consequences in terms of downtime, and associated costs. Moreover, given that in industrial environments, pipes may be used to transport flammable and/or toxic materials, the incorrect identification of and subsequent intervention into a pipe poses a very significant risk to the safety of those performing the repair, other personnel in the vicinity and/or the surrounding environment.

SUMMARY

Aspects of the present disclosure relate to a system and method for identifying a pipe and/or associated component parts of a piping system, in particular to facilitate its repair, maintenance and/or replacement.

According to a first aspect, there is provided a system for identifying a pipe and/or associated component parts of a piping system, comprising:

a vibration generation arrangement configured for engagement with, for coupling to and/or operatively associated with a first pipe section, the vibration generation arrangement configured to generate a vibration in the first pipe section, said vibration forming an identification signal propagating along the pipe;

a vibration detection arrangement configured for engagement with, for coupling to and/or operatively associated with a second pipe section, the vibration detection arrangement configured to detect vibration in the second pipe section and thus identify whether the second pipe section and the first pipe section form part of the same pipe or pipe assembly.

In use, the system generates a vibration in a first pipe section which propagates along the pipe. The vibration detection arrangement is configured to detect vibration in a second pipe section distal to the first pipe section and thus identify whether the second pipe section and the first pipe section form part of the same pipe or pipe assembly.

Beneficially, the present system facilitates quick and accurate identification of a pipe, for example to facilitate its repair, maintenance and/or replacement, and reduces the likelihood that the wrong pipe will be worked on or cut.

Moreover, where sections of pipe are located at height or other relatively inaccessible locations, the system permits inspection and maintenance regimes to be carried out in an efficient manner. The system is effective for use with pipes of various forms and construction, including for example rigid metallic pipe, flexible metallic hose pipe, rigid rubber pipe, flexible rubber hose pipe, rigid plastic pipe, flexible plastic hose pipe, and pipe assemblies constructed from combinations of these.

The system may also be configured to gather, store and/or communicate data relating to the pipe, associated component parts of the piping system and/or the system itself, e.g. for the purposes of producing a digital twin of the pipe and/or associated component parts of the piping system.

Thus, the system may be configured to transmit a temporary, non-invasive, and unique vibration which forms or forms part of a "token" vibration signal with a specific acoustic signature. The token may propagate along the surface of the targeted pipe via surface acoustic waves transmission that can be identified at a point further along the pipe. The token may be detected by the vibration detection arrangement, thereby: confirming the identification of the targeted pipe; identifying that there is no break in continuity of the pipe and/or piping system; and/or identifying potential leak paths. The data can then be captured and recorded digitally, for example allowing the data to integrate with other systems such as 3D modelling software, digital twin software and/or existing digital infrastructure libraries.

The system is particularly beneficial in both domestic and industrial environments where several pipes are located in close proximity and follow complex and overlapping pathways which pass through walls and/or floors from one end to another, and which otherwise require the labour intensive task of following pipework and which nevertheless pose an increased risk of manual error. For example, where a user wishes to check which of a number of second pipe sections corresponds to a given first pipe section, the user may utilise the system to check each second pipe section with the vibration detection arrangement. Where the identification signal is detected in a given second pipe section, the user can confirm that the given second pipe section forms part of the same pipe or pipe assembly as the first pipe section. In industrial environments in which pipes are used to transport flammable and/or toxic materials, the ability of the system to facilitate quick and accurate identification of a pipe reduces the risk that the wrong pipe will be cut and thus mitigates the very significant risks to the safety of those performing the repair, to other personnel in the vicinity and/or the surrounding environment.

The system may be configured for use in identifying a subsea pipe and/or associated component parts of a subsea piping system. For example, the vibration generation arrangement and/or the vibration detection arrangement may be configured for use in a subsea environment. The vibration generation arrangement, the vibration detection arrangement and/or components thereof may be potted or encapsulated. The vibration generation arrangement, the vibration detection arrangement and/or components thereof may be provided within an enclosure. The enclosure may be potted or encapsulated. The enclosure may be waterproof. The enclosure may be constructed from an impact resistant material and/or a material configured to resist the high pressure and low temperatures experiences subsea. For example, but not exclusively, the enclosure may be at least partially constructed from a polyethylene material such as a ultra high molecular weight (UHMW) polyethylene or high density polyethylene (HDPE), a nylon material, an acrylic material, a polycarbonate material, or a polyoxymethylene (POM) material. The system may comprise a heating arrangement. For example, the heating arrangement may comprise one or more heating elements.

The system may be configured to display the vibration detected by the vibration detection arrangement. For example, the vibration detection arrangement may comprise a visual display unit.

In use, a user may compare the displayed vibration with the known vibration generated by the vibration generation arrangement, and thus identify whether the second pipe section and the first pipe section form part of the same pipe or pipe assembly.

Alternatively or additionally, the system may comprise a communication arrangement configured to communicate the vibration detected by the vibration detection arrangement to one or more remote location.

The remote location may comprise or take the form of a mobile device such as tablet, mobile phone or the like. Alternatively or additionally, the remote location may comprise or take the form of a control room.

Beneficially, this permits one or more remote user, in place of or in addition to a user located on site, to compare the displayed vibration with the known vibration generated by the vibration generation arrangement, and thus identify whether the second pipe section and the first pipe section form part of the same pipe or pipe assembly. Moreover, the communication arrangement may facilitate operation in remote and/or relatively inaccessible locations, such as subsea environments, and/or hazardous environments—environments in which for example gases, vapours, mists and/or dust can form an explosive atmosphere with air.

Alternatively or additionally, the remote location may comprise or take the form of a data store, such as an online data store.

Beneficially, this permits information to be recorded, audited and/or interrogated.

The communication arrangement may comprise or take the form of a wireless communication arrangement. The wireless communication arrangement may comprise a radio frequency communication arrangement. The communication arrangement may comprise or take the form of a transmitter or transceiver.

The communication arrangement may comprise or take the form of a wired communication arrangement. The wired communication arrangement may comprise or take the form of an electric wire and/or optical fibre communication arrangement.

Alternatively or additionally, the system may comprise, may be coupled to or operatively associated with a processing system configured to determine whether said detected vibration corresponds to the vibration generated by the vibration generation arrangement.

The processing system, or part of the processing system, may form part of the system. For example, the processing system, or at least part of the processing system may form part of the vibration detection arrangement.

The processing system, or part of the processing system, may be coupled to or operatively associated with the system. For example, the processing system may be located at one or more remote location. The remote location may comprise or take the form of a mobile device such as tablet, mobile phone or the like. Alternatively or additionally, the remote location may comprise or take the form of a control room. Alternatively or additionally, the remote location may comprise or take the form of a data store, such as an online data store.

The system may be configured to transmit information from the processing system to the system. As described above, the system may comprise a communication arrangement configured to communicate the vibration detected by the vibration detection arrangement to one or more remote location. The communication arrangement may comprise or take the form of a two-way communication arrangement. The communication arrangement may comprise or take the form of a transceiver.

In use, the processing system may receive information from the vibration generation arrangement and/or the vibration detection arrangement and determine whether said detected vibration corresponds to the vibration generated by the vibration generation arrangement. The processing system may then communicate a signal to the system to display the result to an onsite user, e.g. via the visual display.

Beneficially, this obviates the requirement for a user to perform the comparison between the displayed vibration and the known vibration generated by the vibration generation arrangement, and thus identify whether the second pipe section and the first pipe section form part of the same pipe or pipe assembly.

As described above, the system comprises a vibration generation arrangement configured to generate a vibration and apply the vibration to the first pipe section.

The vibration generation arrangement may comprise a vibration source. The vibration source may, for example, comprise or take the form of one or more vibration motor.

The vibration motor may comprise or take the form of a rotary drive, such as a DC motor. The vibration motor may comprise an eccentric mass. The eccentric mass may be coupled to a rotor of the rotary drive. In use, when in contact with the pipe, rotation of the eccentric or unbalanced mass by the rotary drive causes repeated displacement of the pipe in the form of vibration. In particular embodiments, the vibration motor may comprise or take the form of a coin type, coreless cylindrical type or surface mount type vibration motor.

The vibration motor may comprise or take the form of a linear drive, such as a linear resonant actuator. The linear drive may comprise a mass coupled to a spring. In use, when in contact with pipe, movement of the mass causes repeated displacement of the pipe in the form of vibration.

The vibration motor may comprise a linear drive, such as a linear resonant actuator.

The vibration generation arrangement may directly induce the vibration of the pipe, for example the vibration generation arrangement may directly contact the pipe.

Alternatively, the system may comprise an applicator. The applicator may form part of the vibration generation arrangement. The applicator may be coupled to or operatively associated with the vibration source. The applicator may be configured to contact the pipe. The applicator may be configured to apply the vibration generated by the vibration source to the pipe.

Beneficially, the provision of an applicator means that the vibration source does not directly contact the pipe and is not open to the surrounding environment. Accordingly, the system may be utilised in remote and/or inaccessible locations, such as subsea environments, and/or hazardous areas—environments in which for example gases, vapours, mists and/or dust can form an explosive atmosphere with air.

The vibration generation arrangement may comprise or take the form of a handheld device. In particular, the vibration source and the applicator may form or form part of the handheld device. The handheld device may comprise a housing.

The system may comprise a securement arrangement configured to secure the vibration generation arrangement to the pipe and/or bring the vibration generation arrangement into contact with the pipe. The shape and/or dimensions of the securement arrangement may be adaptable to different sizes of pipe.

The securement arrangement may comprise or take the form of a clamp. The clamp may be configured for location around at least part of the outer surface of the pipe.

The clamp may be configured to house the vibration source. The vibration source may be disposed within the clamp.

The clamp may comprise a plurality of clamp members. For example, the clamp may comprise two clamp members. The clamp members may be configured for location around at least part of the circumference of the pipe. One or more clamp member may be configured to house one or more vibration motor. The clamp members may be coupled together. The clamp members may be pivotably coupled together, for example by a hinge. The clamp may be biased towards a closed configuration, for example by a spring member.

The first clamp member may comprise a gripping portion for gripping a given one of the pipe sections. The first clamp member may comprise a handle portion. In use, the handle portion may provide a lever for pivoting the first clamp member.

The second clamp member may comprise a gripping portion for gripping a given one of the pipe sections. The second clamp member may comprise a handle portion. In use, the handle portion may provide a lever for pivoting the second clamp member.

A distal end of at least one of the clamp members may comprise or take the form of fingers.

A distal end of at least one of the clamp members may be provided with a high friction material, such as rubber, to provide enhanced gripping with the pipe sections.

Alternatively, the clamp may comprise a single clamp member.

The clamp may comprise a ratchet mechanism. The ratchet mechanism may comprise a first ratchet portion. The first ratchet portion may form part of or may be mounted on the first clamp member. The ratchet mechanism may comprise a second ratchet portion. The second ratchet portion may form part of or may be mounted on the second clamp member.

The securement arrangement may comprise or take the form of a clasp.

The securement arrangement may comprise or take the form of a strap or the like. The strap may comprise or take the form of a ratchet strap.

Beneficially, the provision of a strap, e.g. a ratchet strap, facilitates ease of location and securement to the pipe section, in particular but not exclusively for larger bore pipes.

As an alternative to, or in addition to, other securements, the strap may comprise or take the form of a lanyard or the like. The lanyard may comprise or may be coupled to a cut-off switch. In use, if the vibration generation arrangement falls or becomes detached from the pipe section, the lanyard will extend and operate the cut-off switch, ceasing vibration. The system may send a signal to the operator/user and/or vibration detection arrangement informing of detachment and cessation of operation.

The securement arrangement may comprise a hook and loop fastener.

The securement arrangement may comprise a band e.g. rubber band. The securement arrangement may be constructed from neoprene, or like material.

The securement arrangement may comprise a bracket. The bracket may be configured to mount the vibration generation arrangement to the pipe.

The securement arrangement may comprise or take the form of one or more magnet.

The securement arrangement may comprise one or more mechanical fixing, such as screw, bolts, adhesive, weld connection, thread connection or other suitable means.

As described above, the vibration generation arrangement may be configured for engagement with, for coupling to and/or operatively associated with the first pipe section.

The vibration generation arrangement may be oriented in a plane which is transverse to the longitudinal axis of the pipe. The vibration generation arrangement may extend radially with respect to the pipe. The vibration generation arrangement may be oriented perpendicular or at another non-zero angle with respect to the longitudinal axis of the pipe. The vibration generation arrangement may be oriented across the pipe. The vibration generation arrangement may be oriented parallel to the longitudinal axis of the pipe. The vibration generation arrangement may be oriented along the length of the pipe.

As described above, the vibration applied by the vibration generation arrangement forms an identification signal propagating along the pipe.

The vibration generation arrangement may be configured to generate the vibration with a predetermined profile. For example, the vibration generation arrangement may be configured to generate the vibration with a predetermined amplitude and/or frequency.

The system may be configured to detect a pre-existing or background vibration in the pipe. For example, the vibration detection arrangement may be configured to detect the pre-existing or background vibration in the pipe section. The system may be configured to generate and/or modify the vibration forming the identification signal in response to the detected pre-existing or background vibration in the pipe section. For example, the vibration generation arrangement may be configured to generate and/or modify the vibration forming the identification signal in response to the detected pre-existing or background vibration in the pipe section.

Beneficially, this ensures that a readily distinguishable identification signal with a unique signature (e.g. a unique frequency and/or amplitude, waveform) is generated.

The vibration generation arrangement may comprise, may be coupled to, or operatively associated with a sensor arrangement comprising at least one of:

one or more temperature sensor configured to measure temperature in the first pipe section;

one or more sensor configured to detect whether the first pipe section contains pressurised contents;

one or more sensor configured to detect whether the contents of the first pipe section are flowing or static; and one or more sensor configured to detect whether fluid contained in the first pipe section is a gas or liquid.

The sensor arrangement may comprise a flow meter. The sensor arrangement may comprise a clamp-on flow meter. The sensor arrangement may comprise an electromagnetic flow meter. The sensor arrangement may comprise an ultrasonic flow meter.

The communication arrangement may be configured to communicate the data detected by the sensor arrangement to the one or more remote location.

Beneficially, the sensor arrangement may provide additional data for confirmation of pipe identification.

As described above, the system comprises a vibration detection arrangement configured to detect vibration in the second pipe section.

The vibration detection arrangement may comprise or take the form of a vibration meter, in particular but not exclusively a digital vibration meter.

The vibration detection arrangement may comprise or take the form of a mobile device, such as a mobile phone, tablet or the like, having vibration metering application software.

The vibration detection arrangement may comprise a probe. The probe may be coupled to or form part of the vibration meter or mobile device. The probe may comprise a coupling for coupling the probe to the vibration meter or mobile device. The coupling may be telescopic. The coupling may comprise a data and/or power cable.

The probe may comprise a sensor arrangement configured to detect vibration. The sensor arrangement may comprise one or more sensor. The one or more sensor may comprise or take the form of an accelerometer. The accelerometer may comprise or take the form of a shear-type accelerometer. The accelerometer may comprise or take the form of a piezoelectric accelerometer. The accelerometer may comprise or take the form of a piezoelectric ceramic accelerometer.

The vibration detection arrangement may comprise or take the form of a handheld device. In particular, the vibration meter and/or the probe may form or form part of the handheld device.

The system may comprise a securement arrangement configured to secure the vibration detection arrangement to the pipe and/or bring the vibration detection arrangement into contact with the pipe. The shape and/or dimensions of the securement arrangement may be adaptable to different sizes of pipe.

The securement arrangement may comprise or take the form of a clamp. The clamp may be configured for location around at least part of the outer surface of the pipe.

The clamp may be configured to house the probe and/or the sensor arrangement. The probe and/or the sensor arrangement may be disposed within the clamp.

The clamp may comprise a plurality of clamp members. For example, the clamp may comprise two clamp members. The clamp members may be configured for location around at least part of the circumference of the pipe. One or more clamp member may be configured to house the probe and/or one or more sensor of the sensor arrangement.

The clamp members may be coupled together. The clamp members may be pivotably coupled together, for example by a hinge. The clamp may be biased towards a closed configuration, for example by a spring member.

The first clamp member may comprise a gripping portion for gripping a given one of the pipe sections. The first clamp member may comprise a handle portion. In use, the handle portion may provide a lever for pivoting the first clamp member.

The second clamp member may comprise a gripping portion for gripping a given one of the pipe sections. The second clamp member may comprise a handle portion. In use, the handle portion may provide a lever for pivoting the second clamp member.

A distal end of at least one of the clamp members may comprise or take the form of fingers.

A distal end of at least one of the clamp members may be provided with a high friction material, such as rubber, to provide enhanced gripping with the pipe sections.

Alternatively, the clamp may comprise a single clamp member.

The clamp may comprise a ratchet mechanism. The ratchet mechanism may comprise a first ratchet portion. The first ratchet portion may form part of or may be mounted on the first clamp member. The ratchet mechanism may comprise a second ratchet portion. The second ratchet portion may form part of or may be mounted on the second clamp member.

The securement arrangement may comprise or take the form of a clasp.

The securement arrangement may comprise or take the form of a strap or the like. The strap may comprise or take the form of a ratchet strap.

Beneficially, the provision of a strap, e.g. a ratchet strap, facilitates ease of location and securement to the pipe section, in particular but not exclusively for larger bore pipes.

As an alternative to, or in addition to other securements, the strap may comprise or take the form of a lanyard or the like. The lanyard may comprise or may be coupled to a cut-off switch. In use, if the vibration detection arrangement falls or becomes detached from the pipe section, the lanyard will extend and operate the cut-off switch. The system may send a signal to the operator/user and/or vibration generation arrangement informing of detachment and cessation of operation.

The securement arrangement may comprise a hook and loop fastener.

The securement arrangement may comprise a band e.g. rubber band. The securement arrangement may be constructed from neoprene, or like material.

The securement arrangement may comprise a bracket. The bracket may be configured to mount the vibration generation arrangement to the pipe.

The securement arrangement may comprise or take the form of one or more magnet.

The securement arrangement may comprise or take the form of one or more adhesive bond.

The system may be configured to be removably or detachably coupled to the pipe section. For example, the securement arrangements of the vibration generation arrangement and/or the vibration detection arrangement may be configured to be removably or detachably coupled to their respective pipe sections.

Alternatively, the system may form a permanent installation.

The vibration detection arrangement may comprise, may be coupled to, or operatively associated with a sensor arrangement comprising at least one of: one or more temperature sensor configured to measure temperature in the second pipe section;

one or more sensor configured to detect whether the second pipe section contains pressurised contents;

one or more sensor configured to detect whether the contents of the second pipe section are flowing or static; and one or more sensor configured to detect whether fluid contained in the second pipe section is a gas or liquid.

The sensor arrangement may comprise a flow meter. The sensor arrangement may comprise a clamp-on flow meter. The sensor arrangement may comprise an electromagnetic flow meter. The sensor arrangement may comprise an ultrasonic flow meter.

The communication arrangement may be configured to communicate the data detected by the sensor arrangement to the one or more remote location.

Beneficially, the sensor arrangement may provide additional data for confirmation of pipe identification.

The system may comprise a position sensing arrangement. For example, the sensor arrangement of the vibration generation arrangement may comprise, may be coupled to, or operatively associated with a position sensor, such as a GPS (Global Positioning System) sensor, GNSS (Global Navigation Satellite System) sensor, Radio Frequency position sensing arrangement such as a Bluetooth Low Energy position sensing arrangement or the like. The position sensing arrangement may be provided on or form part of the vibration generation arrangement and/or the vibration detection arrangement.

In use, the position sensing arrangement may permit location data to be determined, communicated and/or recorded, e.g. to said remote location. Location data output from the position sensing arrangement may, for example, be input into a digital library or software, so as to identify the location of the system relative to infrastructure.

At least part of the system may be remotely activatable. The vibration generation arrangement may be remotely activatable. Alternatively or additionally, the vibration generation arrangement may be remotely activatable.

The system may be configurable in a sleep mode. In the sleep mode, the vibration generation arrangement and the vibration detection arrangement may be in a dormant condition. The system may be reconfigurable from the sleep mode to an active mode. In the active mode, the vibration generation arrangement may be configured to apply the vibration to the pipe and the vibration detection arrangement may be configured to detect vibration.

The system may be configurable to operate at one or more preselected times or time intervals. The system may be configurable to operate at one or more preselected times or time intervals and then communicate the data relating to the pipe and/or associated component parts of the piping system and/or the system itself to the remote location, e.g. the remote device.

The system may be configurable to communicate the data relating to the pipe and/or associated component parts of the piping system and/or the system itself to the remote location, e.g. the remote device, in response to a detected vibration exceeding a preselected threshold.

Beneficially, this reduces power requirements of the system.

The system may comprise, may be coupled to, or operatively associated with a camera. The camera may comprise a digital camera. The camera may comprise a CMOS sensor arrangement, or other suitable sensor arrangement. The camera may be disposed on the remote device.

The system may comprise, or may be coupled to, a power supply. In particular embodiments, the system may comprise an onboard power supply. The power supply may take the form of a battery. The battery may comprise or take the form of a rechargeable battery. The battery may comprise or take the form of a lithium-ion polymer (LiPo) battery.

According to a second aspect, there is provided a method for identifying a pipe and/or associated component parts of a piping system, comprising:

generating a vibration in a first pipe section using a vibration generation arrangement, said vibration forming an identification signal propagating along the pipe;

detecting vibration in a second pipe section using a vibration detection arrangement and thus identify whether the second pipe section and the first pipe section form part of the same pipe or pipe assembly.

According to a third aspect, there is provided a system for identifying the integrity of a pipe or pipe assembly, comprising:

a vibration generation arrangement configured for engagement with, for coupling to and/or operatively associated with a first pipe section of a pipe or pipe assembly, the vibration generation arrangement configured to generate a vibration in the first pipe section, said vibration propagating along the pipe;

a vibration detection arrangement configured for engagement with, for coupling to and/or operatively associated with a second pipe section of said pipe or pipe assembly, the vibration detection arrangement configured to detect vibration in the second pipe section, wherein the absence of said vibration identifies a lack of integrity between the first pipe section and the second pipe section.

Beneficially, the system permits a known pipe or pipe assembly to be tested and integrity issues, such as a loose connection, to be identified.

The system may be configured to display the vibration detected by the vibration detection arrangement. For example, the vibration detection arrangement may comprise a visual display unit. The visual display unit may form part of the vibration meter.

Alternatively or additionally, the system may comprise a communication arrangement configured to communicate the vibration detected by the vibration detection arrangement to one or more remote location.

The remote location may comprise or take the form of a mobile device such as tablet, mobile phone or the like.

Alternatively or additionally, the remote location may comprise or take the form of a control room.

Beneficially, this permits one or more remote user, in place of or in addition to a user located on site, to compare the displayed vibration with the known vibration generated by the vibration generation arrangement, the absence of the vibration identifying a lack of integrity between the first pipe section and the second pipe section.

Alternatively or additionally, the remote location may comprise or take the form of a data store, such as an online data store.

Beneficially, this permits information to be recorded, audited and/or interrogated.

The communication arrangement may comprise or take the form of a wireless communication arrangement. The wireless communication arrangement may comprise a radio frequency communication arrangement.

The communication arrangement may comprise or take the form of a transmitter.

The communication arrangement may comprise or take the form of a wired communication arrangement. The wired communication arrangement may comprise or take the form of an electric wire and/or optical fibre communication arrangement.

Alternatively or additionally, the system may comprise, may be coupled to or operatively associated with a processing system.

The processing system, or part of the processing system, may form part of the system. For example, the processing system, or at least part of the processing system may form part of the vibration detection arrangement. In particular, the processing system, or part of the processing system, may form part of the vibration meter.

The processing system, or part of the processing system, may be coupled to or operatively associated with the system. For example, the processing system may be located at one or more remote location. The remote location may comprise or take the form of a mobile device such as tablet, mobile phone or the like. Alternatively or additionally, the remote location may comprise or take the form of a control room. Alternatively or additionally, the remote location may comprise or take the form of a data store, such as an online data store.

The system may be configured to transmit information from the processing system to the system. As described above, the system may comprise a communication arrangement configured to communicate the vibration detected by the vibration detection arrangement to one or more remote location. The communication arrangement may comprise or take the form of a two-way communication arrangement. The communication arrangement may comprise or take the form of a transceiver.

In use, the processing system may receive information from the vibration generation arrangement and/or the vibration detection arrangement and determine whether said detected vibration corresponds to the vibration generated by the vibration generation arrangement. The processing system may then communicate a signal to the system to display the result to an onsite user, e.g. via the visual display. Beneficially, this obviates the requirement for a user to perform the comparison between the displayed vibration and the known vibration generated by the vibration generation arrangement.

As described above, the system comprises a vibration generation arrangement configured to generate a vibration and apply the vibration to the first pipe section.

The vibration generation arrangement may comprise a vibration source. The vibration source may, for example, comprise or take the form of one or more vibration motor.

The vibration motor may comprise or take the form of a rotary drive, such as a DC motor. The vibration motor may comprise an eccentric mass. The eccentric mass may be coupled to a rotor of the rotary drive. In use, when in contact with the pipe, rotation of the eccentric or unbalanced mass by the rotary drive causes repeated displacement of the pipe in the form of vibration. In particular embodiments, the vibration motor may comprise or take the form of a coin type, coreless cylindrical type or surface mount type vibration motor.

The vibration motor may comprise or take the form of a linear drive, such as a linear resonant actuator. The linear drive may comprise a mass coupled to a spring. In use, when in contact with pipe, movement of the mass causes repeated displacement of the pipe in the form of vibration.

The vibration motor may comprise a linear drive, such as a linear resonant actuator.

The vibration generation arrangement may directly induce the vibration of the pipe, for example the vibration generation arrangement may directly contact the pipe.

Alternatively, the system may comprise an applicator. The applicator may form part of the vibration generation arrangement. The applicator may be coupled to or operatively associated with the vibration source. The applicator may be configured to contact the pipe. The applicator may be configured to apply the vibration generated by the vibration source to the pipe.

Beneficially, the provision of an applicator means that the vibration source does not directly contact the pipe and is not open to the surrounding environment. Accordingly, the system may be utilised in hazardous areas—environments in which for example gases, vapours, mists and dust can form an explosive atmosphere with air.

The vibration generation arrangement may comprise or take the form of a handheld device. In particular, the vibration source and the applicator may form or form part of the handheld device. The handheld device may comprise a housing.

The system may comprise a securement arrangement configured to secure the vibration generation arrangement to the pipe and/or bring the vibration generation arrangement into contact with the pipe. The shape and/or dimensions of the securement arrangement may be adaptable to different sizes of pipe.

The securement arrangement may comprise or take the form of a clamp. The securement arrangement, e.g. clamp, may be configured for location around at least part of the outer surface of the pipe. The securement arrangement, e.g. clamp, may comprise or take the form of a ring.

The clamp may be configured to house the vibration source. The vibration source may be disposed within the clamp.

The clamp may comprise a plurality of clamp members. For example, the clamp may comprise two clamp members. The clamp members may be configured for location around at least part of the circumference of the pipe. One or more clamp member may be configured to house one or more vibration motor. The clamp members may be coupled together. The clamp members may be pivotably coupled together, for example by a hinge. The clamp may be biased towards a closed configuration, for example by a spring member.

The first clamp member may comprise a gripping portion for gripping a given one of the pipe sections. The first clamp member may comprise a handle portion. In use, the handle portion may provide a lever for pivoting the first clamp member.

The second clamp member may comprise a gripping portion for gripping a given one of the pipe sections. The second clamp member may comprise a handle portion. In use, the handle portion may provide a lever for pivoting the second clamp member.

A distal end of at least one of the clamp members may comprise or take the form of fingers.

A distal end of at least one of the clamp members may be provided with a high friction material, such as rubber, to provide enhanced gripping with the pipe sections.

Alternatively, the clamp may comprise a single clamp member.

The clamp may comprise a ratchet mechanism. The ratchet mechanism may comprise a first ratchet portion. The first ratchet portion may form part of or may be mounted on the first clamp member. The ratchet mechanism may comprise a second ratchet portion. The second ratchet portion may form part of or may be mounted on the second clamp member.

The securement arrangement may comprise or take the form of a clasp.

The securement arrangement may comprise or take the form of a strap or the like. The strap may comprise or take the form of a ratchet strap.

Beneficially, the provision of a strap, e.g. a ratchet strap, facilitates ease of location and securement to the pipe section, in particular but not exclusively for larger bore pipes.

As an alternative to, or in addition to other securements, the strap may comprise or take the form of a lanyard or the like. The lanyard may comprise or may be coupled to a cut-off switch. In use, if the vibration generation arrangement falls or becomes detached from the pipe section, the lanyard will extend and operate the cut-off switch, ceasing vibration. The system may send a signal to the operator/user and/or vibration detection arrangement informing of detachment and cessation of operation.

The securement arrangement may comprise a hook and loop fastener.

The securement arrangement may comprise a band e.g. rubber band. The securement arrangement may be constructed from neoprene, or like material.

The securement arrangement may comprise a bracket. The bracket may be configured to mount the vibration generation arrangement to the pipe.

The securement arrangement may comprise or take the form of one or more magnet.

The securement arrangement may comprise mechanical fixing, such as screw, bolts, adhesive, weld connection, thread connection or other suitable means.

As described above, the vibration generation arrangement may be configured for engagement with, for coupling to and/or operatively associated with the first pipe section.

The vibration generation arrangement may be oriented in a plane which is transverse to the longitudinal axis of the pipe. The vibration generation arrangement may extend radially with respect to the pipe. The vibration generation arrangement may be oriented perpendicular or at another non-zero angle with respect to the longitudinal axis of the pipe. The vibration generation arrangement may be oriented across the pipe. The vibration generation arrangement may be oriented parallel to the longitudinal axis of the pipe. The vibration generation arrangement may be oriented along the length of the pipe.

The vibration generation arrangement may comprise, may be coupled to, or operatively associated with a sensor arrangement comprising at least one of: one or more temperature sensor configured to measure temperature in the first pipe section;

one or more sensor configured to detect whether the first pipe section contains pressurised contents;

one or more sensor configured to detect whether the contents of the first pipe section are flowing or static; and one or more sensor configured to detect whether fluid contained in the first pipe section is a gas or liquid.

The sensor arrangement may comprise a flow meter. The sensor arrangement may comprise a clamp-on flow meter. The sensor arrangement may comprise an electromagnetic flow meter. The sensor arrangement may comprise an ultrasonic flow meter.

The communication arrangement may be configured to communicate the data detected by the sensor arrangement to the one or more remote location.

As described above, the system comprises a vibration detection arrangement configured to detect vibration in the second pipe section.

The vibration detection arrangement may comprise or take the form of a vibration meter, in particular but not exclusively a digital vibration meter.

The vibration detection arrangement may comprise a probe. The probe may be coupled to or form part of the vibration meter. The probe may comprise a coupling for coupling the probe to the vibration meter. The coupling may be telescopic. The coupling may comprise a data and/or power cable.

The probe may comprise a sensor arrangement configured to detect vibration. The sensor arrangement may comprise one or more sensor. The one or more sensor may comprise or take the form of an accelerometer. The accelerometer may comprise or take the form of a shear-type accelerometer. The accelerometer may comprise or take the form of a piezoelectric accelerometer. The accelerometer may comprise or take the form of a piezoelectric ceramic accelerometer.

The vibration detection arrangement may comprise or take the form of a handheld device. In particular, the vibration meter and/or the probe may form or form part of the handheld device.

The system may comprise a securement arrangement configured to secure the vibration detection arrangement to the pipe and/or bring the vibration detection arrangement into contact with the pipe. The shape and/or dimensions of the securement arrangement may be adaptable to different sizes of pipe.

The securement arrangement may comprise or take the form of a clamp. The securement arrangement, e.g. clamp, may be configured for location around at least part of the outer surface of the pipe. The securement arrangement, e.g. clamp, may comprise or take the form of a ring.

The clamp may be configured to house the probe and/or the sensor arrangement. The probe and/or the sensor arrangement may be disposed within the clamp.

The clamp may comprise a plurality of clamp members. For example, the clamp may comprise two clamp members.

The clamp members may be configured for location around at least part of the circumference of the pipe. One or more clamp member may be configured to house the probe and/or one or more sensor of the sensor arrangement.

The clamp members may be coupled together. The clamp members may be pivotably coupled together, for example by a hinge. The clamp may be biased towards a closed configuration, for example by a spring member.

The first clamp member may comprise a gripping portion for gripping a given one of the pipe sections. The first clamp member may comprise a handle portion. In use, the handle portion may provide a lever for pivoting the first clamp member.

The second clamp member may comprise a gripping portion for gripping a given one of the pipe sections. The second clamp member may comprise a handle portion. In use, the handle portion may provide a lever for pivoting the second clamp member.

A distal end of at least one of the clamp members may comprise or take the form of fingers.

A distal end of at least one of the clamp members may be provided with a high friction material, such as rubber, to provide enhanced gripping with the pipe sections.

Alternatively, the clamp may comprise a single clamp member.

The clamp may comprise a ratchet mechanism. The ratchet mechanism may comprise a first ratchet portion. The first ratchet portion may form part of or may be mounted on the first clamp member. The ratchet mechanism may comprise a second ratchet portion. The second ratchet portion may form part of or may be mounted on the second clamp member.

The securement arrangement may comprise or take the form of a clasp.

The securement arrangement may comprise or take the form of a strap or the like.

The strap may comprise or take the form of a ratchet strap.

Beneficially, the provision of a strap, e.g. a ratchet strap, facilitates ease of location and securement to the pipe section, in particular but not exclusively for larger bore pipes.

As an alternative to, or in addition to other securements, the strap may comprise or take the form of a lanyard or the like. The lanyard may comprise or may be coupled to a cut-off switch. In use, if the vibration detection arrangement falls or becomes detached from the pipe section, the lanyard will extend and operate the cut-off switch. The system may send a signal to the operator/user and/or vibration generation arrangement informing of detachment and cessation of operation.

The securement arrangement may comprise a hook and loop fastener.

The securement arrangement may comprise a band e.g. rubber band. The securement arrangement may be constructed from neoprene, or like material.

The securement arrangement may comprise a bracket. The bracket may be configured to mount the vibration generation arrangement to the pipe.

The securement arrangement may comprise or take the form of one or more magnet.

The securement arrangement may comprise or take the form of one or more adhesive bond.

The vibration detection arrangement may comprise, may be coupled to, or operatively associated with a sensor arrangement comprising at least one of:

one or more temperature sensor configured to measure temperature in the second pipe section;

one or more sensor configured to detect whether the second pipe section contains pressurised fluid;

one or more sensor configured to detect whether the second pipe section contains fluid which is flowing or static; and one or more sensor configured to detect whether fluid contained in the second pipe section is a gas or liquid.

The communication arrangement may be configured to communicate the data detected by the sensor arrangement to the one or more remote location.

At least part of the system may be remotely activatable. The vibration generation arrangement may be remotely activatable. Alternatively or additionally, the vibration generation arrangement may be remotely activatable.

The system may be configurable in a sleep mode. In the sleep mode, the vibration generation arrangement and the vibration detection arrangement may be in a dormant condition. The system may be reconfigurable from the sleep mode to an active mode. In the active mode, the vibration generation arrangement may be configured to apply the vibration to the pipe and the vibration detection arrangement may be configured to detect vibration. Beneficially, this reduces power requirements of the system.

The system may be configured to operate at one or more preselected times or time intervals. The system may be configurable to operate at one or more preselected times or time intervals and then communicate the vibration data relating to the pipe and/or associated component parts of the piping system and/or the system itself to the remote location, e.g. the mobile device.

The system may be configured to compare the vibration data from two or more of said preselected times or time intervals. The processing system may be configured to compare the vibration data from said two or more of said preselected times or time intervals.

Beneficially, the system may permit monitoring to be carried out over time and/or confirm whether any integrity issues have developed using a periodic/scheduled check and comparing the results.

The system may be configured to communicate the data relating to the pipe section and/or associated component parts of the piping system and/or the system itself to the remote location, e.g. the mobile device, in response to a detected vibration exceeding a preselected threshold.

Beneficially, this reduces power requirements of the system.

The system may comprise, or may be coupled to, a power supply. In particular embodiments, the system may comprise an onboard power supply. The power supply may take the form of a battery.

The system may be configured to be removably or detachably coupled to the pipe. For example, the securement arrangements of the vibration generation arrangement and/or the vibration detection arrangement may be configured to be removably or detachably coupled to their respective pipe sections.

Alternatively, the system may form a permanent installation.

The system may comprise one or more tags for attachment to the first pipe section and/or the second pipe section. The tags may comprise or take the form of a machine readable code, such as a barcode or QR code.

According to a fourth aspect, there is provided a method for identifying the integrity of a pipe or pipe assembly, comprising:

generating a vibration in a first pipe section of a pipe or pipe assembly using a vibration generation arrangement, said vibration propagating along the pipe;

detecting vibration in a second pipe section of said pipe or pipe assembly using a vibration detection arrangement, wherein the absence of said vibration identifies a lack of integrity between the first pipe section and the second pipe section.

According to another aspect, there is provided a processing system configured to implement one or more of the previous aspects.

The processing system may comprise at least one processor. The processing system may comprise and/or be configured to access at least one data store or memory. The data store or memory may comprise or be configured to receive operating instructions or a program specifying operations of the at least one processor. The at least one processor may be configured to process and implement the operating instructions or program.

The at least one data store may comprise a reader, drive or other means configured to access, optical storage or disk such as a CD or DVD, flash drive, SD device, one or more memory chips such as DRAMs, a network attached drive (NAD), cloud storage, magnetic storage such as tape or magnetic disk or a hard-drive, and/or the like.

The processing system may comprise a network or interface module. The network or interface module may be connected or connectable to a network connection or data carrier, which may comprise a wired or wireless network connection or data carrier, such as a data cable, power line data carrier, Wi-Fi, Bluetooth, Zigbee, internet connection or other similar connection. The network interface may comprise a router, modem, gateway and/or the like. The system or processing system may be configured to transmit or otherwise provide the audio signal via the network or interface module, for example over the internet, intranet, network or cloud.

The processing system may comprise a processing apparatus or a plurality of processing apparatus. Each processing apparatus may comprise at least a processor and optionally a memory or data store and/or a network or interface module. The plurality of processing apparatus may communicate via respective network or interface modules. The plurality of processing apparatus may form, comprise or be comprised in a distributed or server/client based processing system.

According to another aspect, there is provided a computer program product configured such that when processed by a suitable processing system configures the processing system to implement one or more of the previous aspects.

The computer program product may be provided on or comprised in a carrier medium. The carrier medium may be transient or non-transient. The carrier medium may be tangible or non-tangible. The carrier medium may comprise a signal such as an electromagnetic or electronic signal. The carrier medium may comprise a physical medium, such as a disk, a memory card, a memory, and/or the like.

According to another aspect, there is provided a carrier medium, the carrier medium comprising a signal, the signal when processed by a suitable processing system causes the processing system to implement one or more of the previous aspects.

It will be well understood by persons of ordinary skill in the art that whilst some embodiments may implement certain functionality by means of a computer program having computer-readable instructions that are executable to perform the method of the embodiments. The computer program functionality could be implemented in hardware (for example by means of a CPU or by one or more ASICs (application specific integrated circuits)) or by a mix of hardware and software.

Whilst particular pieces of apparatus have been described herein, in alternative embodiments, functionality of one or more of those pieces of apparatus can be provided by a single unit, processing resource or other component, or functionality provided by a single unit can be provided by two or more units or other components in combination. For example, one or more functions of the processing system may be performed by a single processing device, such as a personal computer or the like, or one or more or each function may be performed in a distributed manner by a plurality of processing devices, which may be locally connected or remotely distributed.

The invention is defined by the appended claims. However, for the purposes of the present disclosure it will be understood that any of the features defined above or described below may be utilised in isolation or in combination. For example, features described above in relation to one of the above aspects or below in relation to the detailed description below may be utilised in any other aspect, or together form a new aspect.

BRIEF DESCRIPTION OF THE DRAWINGS

These and other aspects will now be described, by way of example only, with reference to the accompanying drawings, in which.

DETAILED DESCRIPTION OF THE DRAWINGS

Figure 1:
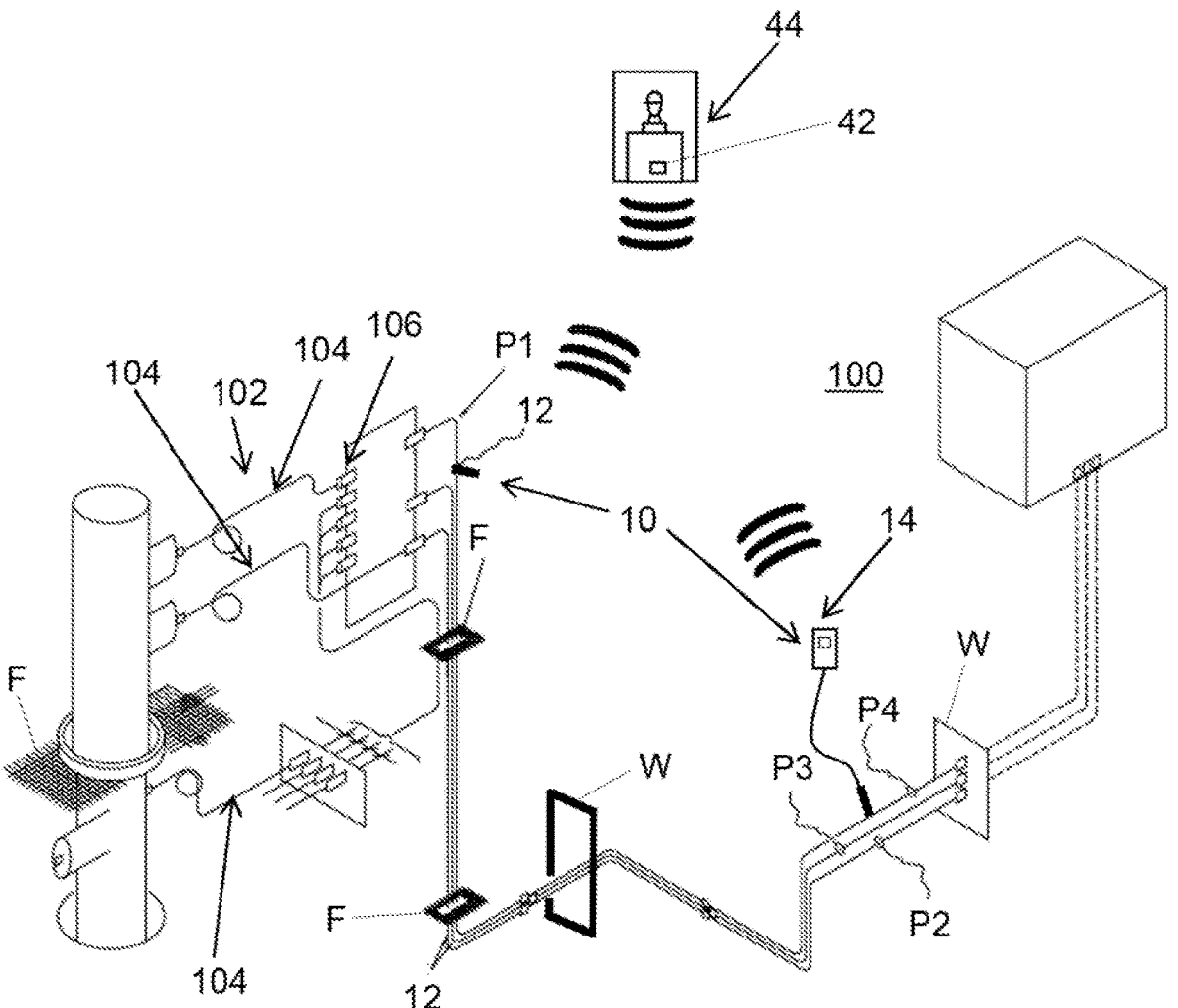
FIG. 1 shows a diagrammatic view of a system for identifying a pipe and/or associated component parts of a piping system, to facilitate its repair, maintenance and/or replacement, shown located on a pipe network of an installation.

Referring first to FIG. 1 of the accompanying drawings, there is shown a diagrammatic view of a system, generally denoted 10, for identifying a pipe and/or associated component parts of a piping system, for example to facilitate its repair, maintenance and/or replacement. As shown in FIG. 1, the system 10 is shown located on an installation, generally denoted 100, comprising a pipe network, generally denoted 102. The pipe network 102 includes several pipes 104 and pipe connectors 106. The pipes 104 are located in close proximity and follow complex and overlapping pathways which pass through walls W and/or floors F of the installation 100. The installation 100 shown in FIG. 1 takes the form of an offshore oil and/or gas platform. However, it will be understood that the system 10 may be utilised with pipe networks and installations in variety of industries, including for example but not exclusively the petrochemical, chemical, food and drink processing, power generation and/or water industries.

As shown in FIG. 1, the system 10 comprises a vibration generation arrangement 12 and a vibration detection arrangement 14. The vibration generation arrangement 12 is configured for engagement with, for coupling to and/or operatively associated with a first pipe section P1, and is configured to generate a vibration in the first pipe section P1 when brought into contact with the first pipe section P1. In use, the vibration generation arrangement 12 generates a vibration in a first pipe section P1 which propagates along the pipe. The vibration detection arrangement 14 is configured to detect vibration in one or more second pipe sections P2, P3, P4 distal to the first pipe section P1 so that it can be determined which if any of the second pipe sections P2, P3, P4 forms part of the same pipe or pipe assembly as the first pipe section P1.

Beneficially, the present system 10 facilitates quick and accurate identification of a pipe, for example to facilitate its repair, maintenance and/or replacement, and reduces the likelihood that the wrong pipe (in the present system 10 one of pipe sections P2, P3 or P4) will be worked on or cut. Moreover, where sections of pipe are located at height or other relatively inaccessible locations, the system 10 permits inspection and maintenance regimes to be carried out in an efficient manner. The system 10 is effective for use with pipes of various forms and construction, including rigid metallic pipe, flexible metallic hose pipe, rigid plastic pipe, flexible plastic hose pipe and pipe assemblies constructed from combinations of these. The system 10 is particularly beneficial in both domestic and industrial environments where several pipes are located in close proximity and follow complex and overlapping pathways which pass through walls and/or floors from one end to another, and which otherwise require the labour intensive task of following pipework and which nevertheless pose an increased risk of manual error. For example, where a user wishes to check which of a number of second pipe sections corresponds to a given first pipe section, the user may utilise the system 10 to check each second pipe section with the vibration detection arrangement. Where the identification signal is detected in a given second pipe section, the user can confirm that the given second pipe section forms part of the same pipe or pipe assembly as the first pipe section. In industrial environments where pipes are used to transport flammable and/or toxic materials, the ability of the system 10 to facilitate quick and accurate identification of a pipe reduces the risk that the wrong pipe will be cut and thus mitigates the very significant risks to the safety of those performing the repair, other personnel in the vicinity and/or the surrounding environment.

Figure 2:
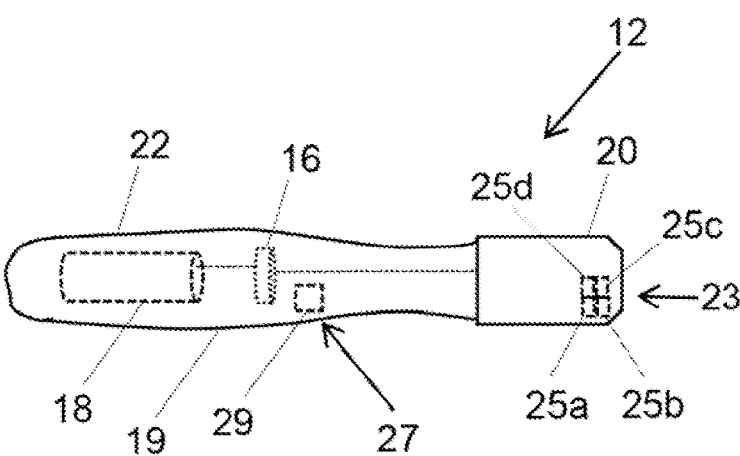
FIG. 2 shows a vibration generation arrangement of the system shown in FIG. 1.

Referring now also to FIG. 2 of the accompanying drawings, there is shown an enlarged view of the vibration generation arrangement 12. As shown in FIG. 2, the vibration generation arrangement 12 comprises a vibration source 16, which in the illustrated system 10 takes the form of a vibration motor and in particular a coreless cylindrical type or coin type ERM vibration motor. The vibration source 16 is powered by an onboard power supply in the form of a battery 18. The vibration source 16 is located within a housing 19. The vibration generation arrangement 12 also comprises an applicator 20 for contacting the first pipe section P1. The applicator 20 is coupled to or operatively associated with the vibration source 16 and applies the vibration generated by the vibration source 16 to the first pipe section P1. The vibration source 16 is located in the housing 19 with a conductive material (not shown) between it and the pipe section P1, allowing the vibration to be transmitted to the pipe section P1 by contact. Beneficially, the provision of the applicator 20 means that the vibration source 16 does not directly contact the pipe P1 and is not open to the surrounding environment. Accordingly, the system 10 may be utilised in hazardous areas—environments in which for example gases, vapours, mists and dust can form an explosive atmosphere with air.

As shown in FIG. 2, the vibration generation arrangement 12 takes the form of a handheld device forming a housing 22 for the vibration source 16. In the illustrated system 10, the vibration generation arrangement 12 comprises a sensor arrangement, generally denoted 23, which comprises one or more temperature sensor 25a for measuring temperature at the first pipe section P1, one or more sensor 25b for detecting whether the pipe assembly contains pressurised contents, one or more sensor 25c for detecting whether contained in the first pipe section P1 are flowing or static, and one or more sensor 25d for detecting whether fluid contained in the first pipe section P1 is a gas or liquid. In the illustrated system 10, the sensor arrangement 25 is located in the applicator 20 but may be located at any suitable location on the vibration generation arrangement 12.

The vibration generation arrangement 12 comprises a communication arrangement, generally denoted 27 for communicating with a processor, generally denoted 42 (shown in FIG. 1). In the illustrated system 10, the communication arrangement 27 is a two-way communication arrangement having a transceiver 29. However, it will be understood that the communication arrangement may alternatively be a one-way communication arrangement having a transmitter in place of the transceiver 29. In the illustrated system 10, the processor 42 is located at a remote location such as a control room 44. However, it will be understood that the remote location may comprise or take the form of a mobile device such as tablet, mobile phone or the like and/or a data store, such as an online data store.

Figure 3:
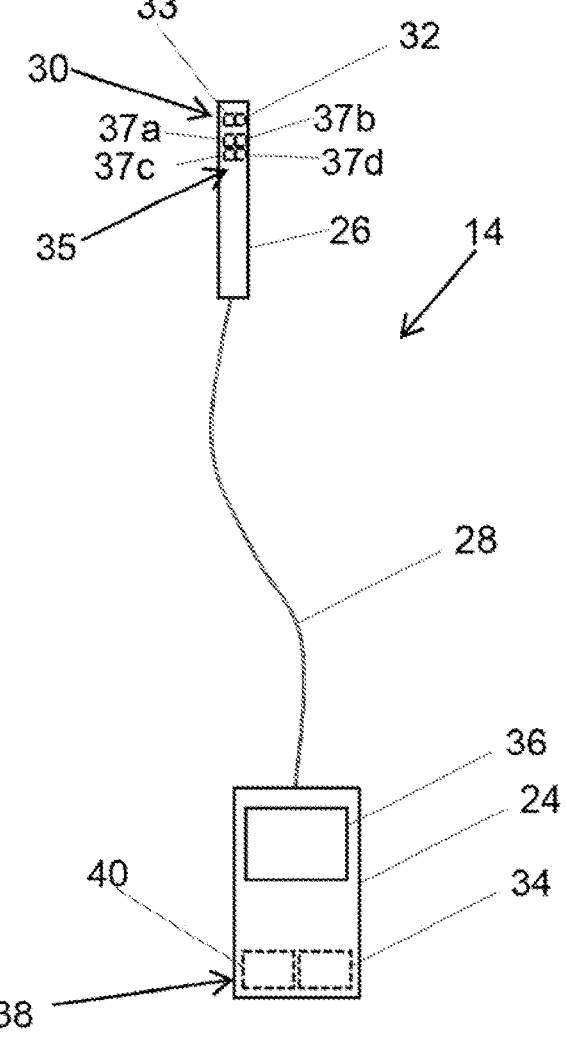
FIG. 3 shows a vibration detection arrangement of the system shown in FIG. 1.

Referring now also to FIG. 3 of the accompanying drawings, there is shown an enlarged view of the vibration detection arrangement 14. As shown in FIG. 3, the vibration detection arrangement 14 comprises a vibration meter 24, which in the illustrated system 10 takes the form of a digital vibration meter. The vibration detection arrangement 14 comprises a probe 26. A coupling 28 couples the probe 26 to the vibration meter 24. In the illustrated system 10, the coupling 28 comprises a data and/or power cable.

As shown in FIG. 3, the vibration detection arrangement 14 comprises a sensor arrangement, generally denoted 30, which comprises one or more sensor 32 configured to detect vibration. In the illustrated system 10, the sensor 32 takes the form of a piezoelectric accelerometer, and more specifically a shear-type piezoelectric ceramic accelerometer. The vibration detection arrangement 14 is powered by an onboard power supply in the form of a battery 34. In the illustrated system 10, the vibration detection arrangement 14 comprises a sensor arrangement, generally denoted 35, which comprises one or more temperature sensor 37a for measuring temperature at the second pipe sections P2; P3; P4, one or more sensor 37b for detecting whether the second pipe sections P2; P3; P4 contain pressurised contents, one or more sensor 37c for detecting whether the contents of the second pipe sections P2; P3; P4 are flowing or static, and one or more sensor 37d for detecting whether fluid contained in the second pipe sections P2; P3; P4 is a gas or liquid. In the illustrated system 10, the sensor arrangement 35 is located in the probe 26 but may be located at any suitable location on the vibration detection arrangement 14.

As shown in FIG. 3, in the illustrated system 10 the vibration meter 24 comprises a visual display 36 for communicating the detected vibration from sensor arrangements 30, 35 to an onsite user. The vibration meter 24 comprises a communication arrangement, generally denoted 38 for communicating with the processor 42 (shown in FIG. 1). In the illustrated system 10, the communication arrangement 38 is a two-way communication arrangement having a transceiver 40. However, it will be understood that the communication arrangement 38 may alternatively be a one-way communication arrangement having a transmitter in place of the transceiver 40.

In the illustrated system 10, the processor 42 is located at a remote location such as a control room 44. However, it will be understood that the remote location may comprise or take the form of a mobile device such as tablet, mobile phone or the like and/or a data store, such as an online data store. Beneficially, this permits one or more remote user, in place of or in addition to a user located on site, to compare the displayed vibration with the known vibration generated by the vibration generation arrangement 12.

Figure 4:
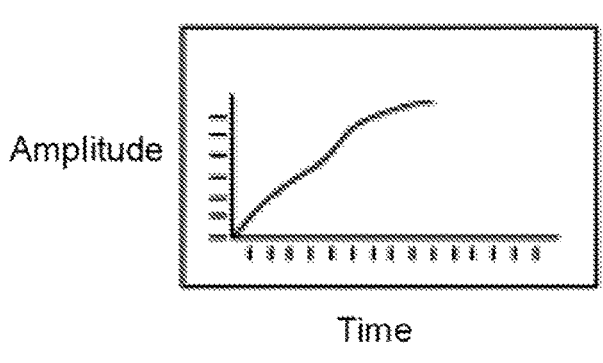
FIG. 4 shows a graph showing the vibration generated by the vibration generation arrangement when contacting second pipe section P1.

In use, the vibration generation arrangement 12 is operable to generate a vibration in first pipe section P1 which propagates along the pipe as an identification signal. FIG. 4 shows the vibration forming the identification signal. At a distal location to the first pipe section P1, the vibration detection arrangement 14 is used to detect which of the second pipe sections P2, P3 and P4 is vibrating at a corresponding amplitude and/or frequency to that of the identification signal; and thereby forms part of the same pipe or pipe assembly to that of the first pipe section P1.

Figure 5:
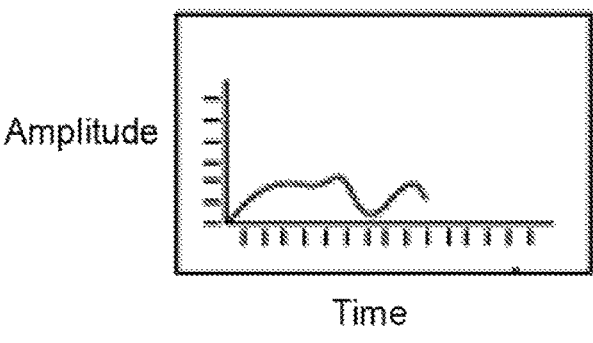
FIG. 5 shows a graph showing the vibration detected by the vibration detection arrangement of the system shown in FIG. 1 when contacting second pipe section P2.
Figure 6:
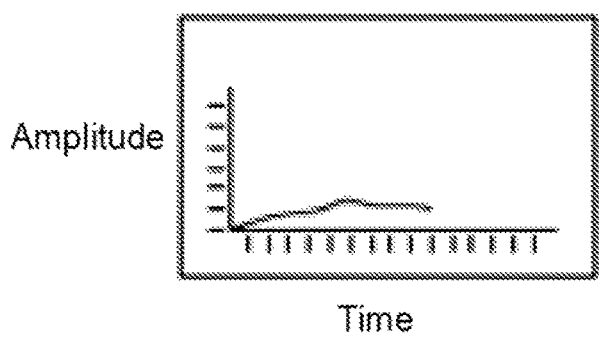
FIG. 6 shows a graph showing the vibration detected by the vibration detection arrangement of the system shown in FIG. 1, when contacting second pipe section P3.
Figure 7:
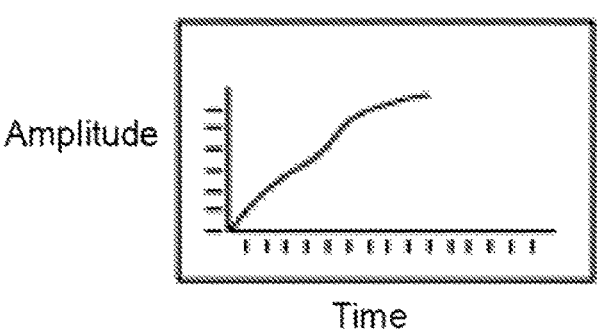
FIG. 7 shows a graph showing the vibration detected by the vibration detection arrangement of the system shown in FIG. 1, when contacting second pipe section P4.

As shown in FIGS. 5, 6 and 7 of the accompanying drawings, which show the vibration detected by the vibration detection arrangement 14 when respectively contacting second pipe section P2, second pipe section P3 and second pipe section P4, respectively, it can be seen that in the present case pipe section P4 shows a distinct vibration signature over and above that of second pipe sections P2 and P3 and which corresponds to the vibration signal generated by the vibration generation arrangement 12, and thus showing that the second pipe section P4 forms part of the same pipe or pipe assembly to that of first pipe section P1.

Beneficially, the system permits a known pipe or pipe assembly to be tested and integrity issues, such as a loose connection, to be identified.

It will be understood that various modifications may be made without departing from the scope of the claimed invention. For example, FIGS. 8 to 11 of the accompanying drawings shows part of system 110 comprising an alternative vibration generation arrangement, generally denoted 112. As shown in FIGS. 8 to 11, the vibration generation arrangement 112 comprises a clamp 146 for securing the vibration generation arrangement 112 to the first pipe section P1.

In the illustrated system 110, the clamp 146 generally takes the form of a claw grip having first and second clamp members 148, 150 pivotably coupled together by a hinge 152. However, it will be understood that the clamp may alternatively comprise a single clamp member. The clamp 146 is biased towards a closed configuration by a spring member 154 (shown in FIG. 11) coupled to the first and second clamp members 148, 150. The spring force provided by the spring member 154 is selected so that the clamp 146 securely grips the pipe sections P1; P2; P3; P4 but permits a user to open the clamp 146, preferably using one hand. Beneficially, this facilitates use of the clamp 146 with pipes which are located in relatively inaccessible locations.

Figures 8, 9, 10:
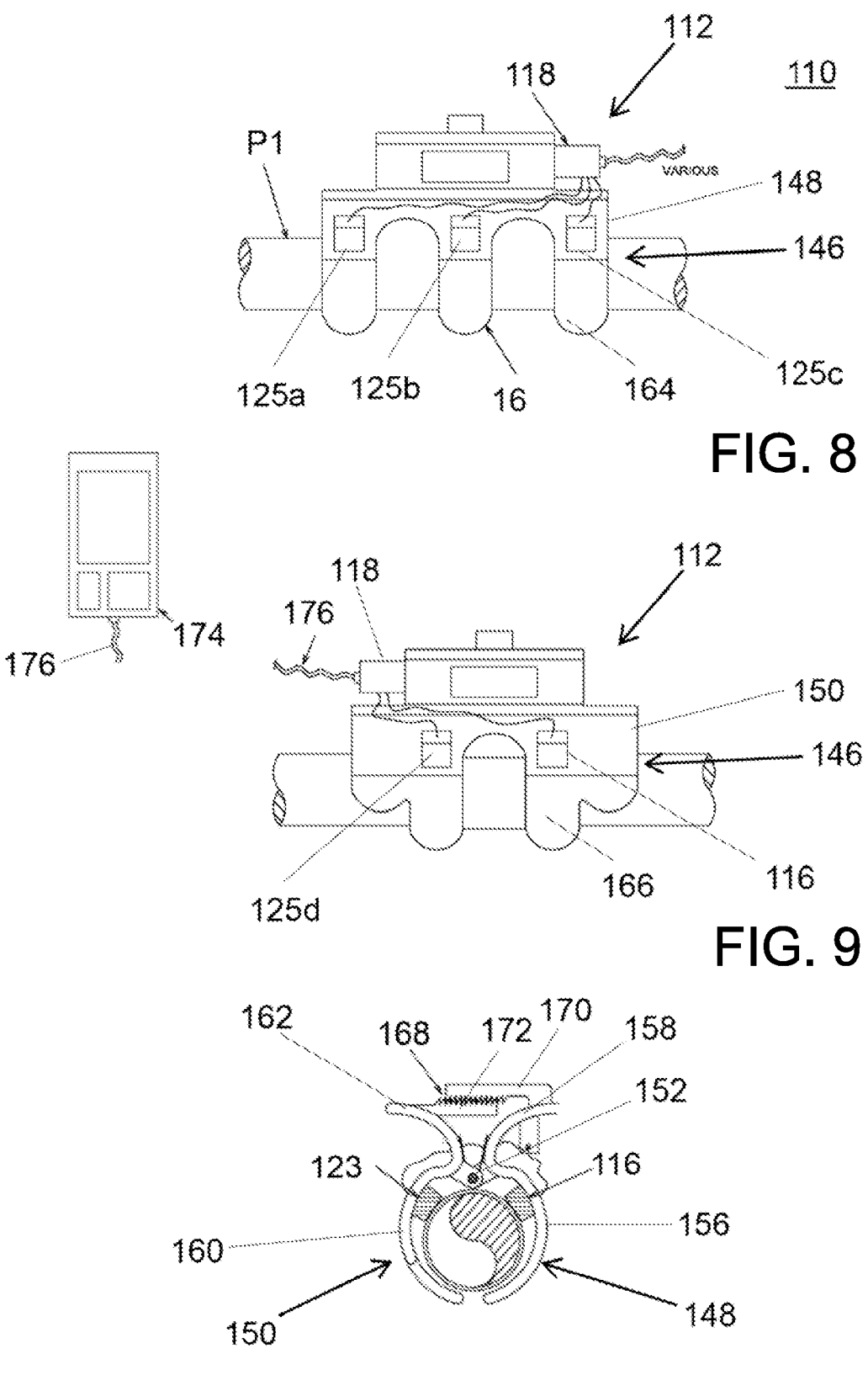
FIGS. 8 to 11 show an alternative vibration generation arrangement to that shown in FIG. 1.
Figure 11:
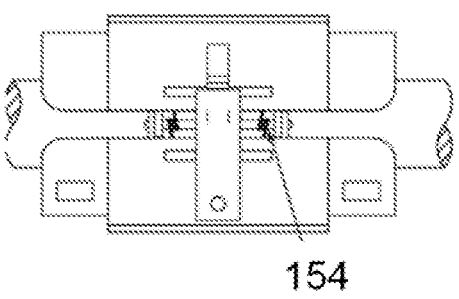

As shown most clearly in FIG. 10, the clamp member 148 comprises a gripping portion 156 for gripping a given one of the pipe sections P1; P2; P3; P4 and a handle portion 158. In use, the handle portion 158 provides a lever for pivoting the clamp member 148 about the hinge 152. Similarly, the clamp member 150 comprises a gripping portion 160 for gripping a given one of the pipe sections P1; P2; P3; P4 and a handle portion 162. In use, the handle portion 162 provides a lever for pivoting the clamp member 150 about the hinge 152.

As shown most clearly in FIGS. 8 and 9, distal ends 164, 166 of the clamp members 148, 150 take the form of fingers. The distal ends 164, 166 are provided with a high friction material, such as rubber, to provide enhanced gripping with the pipe sections P1; P2; P3; P4.

As shown most clearly in FIG. 10, the clamp 146 further comprises a ratchet mechanism, generally denoted 168. The ratchet mechanism 168 comprises a first ratchet portion 170 forming part of or mounted on the first clamp member 148 and a second ratchet portion 172 forming part of or mounted on the second clamp member 150. The ratchet mechanism 168 includes a ratchet release to permit the ratchet formed by the ratchet mechanism 168 to be released.

The vibration generation arrangement 112 comprises a vibration source 116, which takes the form of a vibration motor and in particular a coreless cylindrical type or coin type ERM vibration motor. The vibration source 116 is powered by an onboard power supply in the form of a battery 118. The vibration source 116 is located in the clamp 146 with a conductive material (not shown) permitting the vibration to be transmitted to the pipe section P1 by contact.

In the illustrated system 110, the vibration generation arrangement 112 comprises a sensor arrangement, generally denoted 123, which comprises one or more temperature sensor 125a for measuring temperature at the first pipe section P1, one or more sensor 125b for detecting whether the pipe assembly contains pressurised fluid, one or more sensor 125c for detecting whether the first pipe section P1 contains fluid which is flowing or static, and one or more sensor 125d for detecting whether fluid contained in the first pipe section P1 is a gas or liquid.

In the illustrated system 110, the vibration generation arrangement 112 communicates with a handheld device 174 via data cable 176.

In addition to the vibration generation arrangement 112, the system 110 utilises the vibration detection arrangement 14 described above to detect the vibration at the second pipe sections P2; P3; P4.

Figure 12:
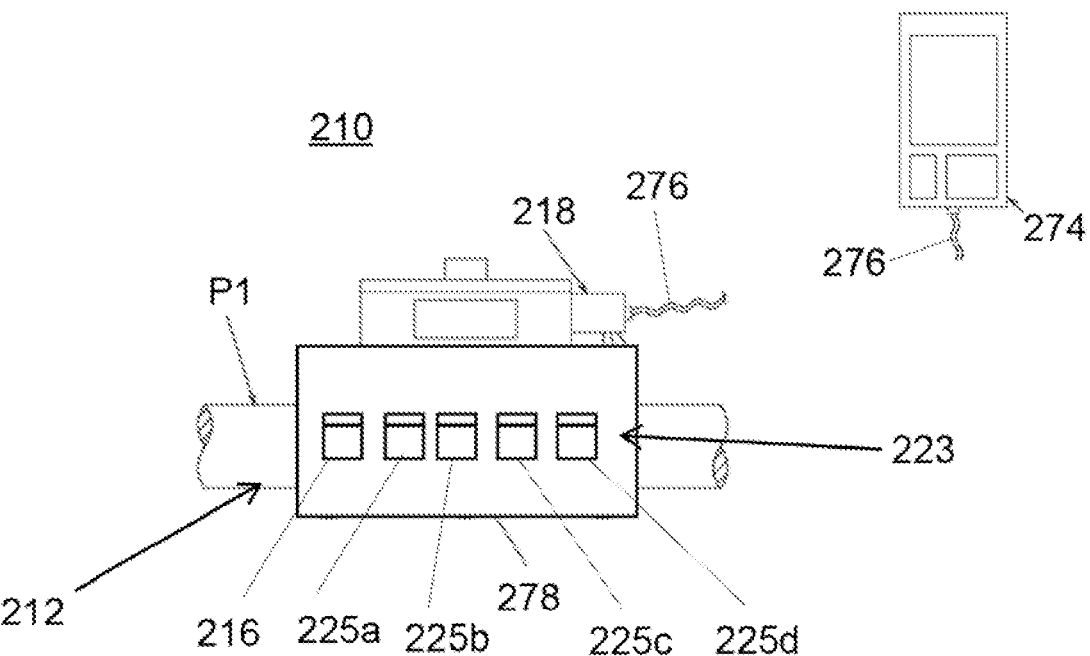
FIG. 12 show a further alternative vibration generation arrangement to that shown in FIG. 1.

As described above, various modifications may be made without departing from the scope of the claimed invention and FIG. 12 of the accompanying drawings shows a part of system 210 comprising an alternative vibration generation arrangement, generally denoted 212. As shown in FIG. 12, the vibration generation arrangement 212 comprises a strap 278, in particular a ratchet strap, for securing the vibration generation arrangement 212 to the first pipe section P1. The strap 278 facilitates location and securement of the vibration generation arrangement 212 to the first pipe section P1 and is particularly beneficial with larger bore pipes.

The vibration generation arrangement 212 comprises a vibration source 216, which takes the form of a vibration motor and in particular a coreless cylindrical type or coin type ERM vibration motor. The vibration source 216 is powered by an onboard power supply in the form of a battery 218.

In the illustrated system 210, the vibration generation arrangement 212 comprises a sensor arrangement, generally denoted 223, which comprises one or more temperature sensor 225a for measuring temperature at the first pipe section P1, one or more sensor 225b for detecting whether the first pipe section contains pressurised contents, one or more sensor 225c for detecting whether the contents of the first pipe section P1 are flowing or static, and one or more sensor 225d for detecting whether fluid contained in the first pipe section P1 is a gas or liquid.

In the illustrated system 210, the vibration generation arrangement 212 communicates with a handheld device 274 via data cable 276.

In addition to the vibration generation arrangement 212, the system 210 utilises the vibration detection arrangement 14 described above to detect the vibration at the second pipe sections P2; P3; P4.

In addition to, or as an alternative to the operation described above, the system 10 may be used to identify a lack of integrity in a known pipe or pipe assembly. As described above, the vibration generation arrangement 12 is operable to generate a vibration in a first pipe section which propagates along the pipe. The vibration detection arrangement 14 may be used to detect whether a second pipe section of the same pipe is vibrating at a corresponding amplitude and/or frequency to that generated by the vibration generation arrangement; the absence of said vibration identifying a lack of integrity between the first pipe section and the second pipe section.

Beneficially, the system 10 permits a known pipe or pipe assembly to be tested and integrity issues, such as a loose connection, to be identified.

Referring now to FIGS. 13 to 17 of the accompanying drawings, there is shown an example of another vibration generation arrangement, generally denoted 312.

As shown, the vibration generation arrangement 312 comprises a strap 378 for securing the vibration generation arrangement 312 to the first pipe section P1, a vibration generation module 380 and a controller module 382.

Figure 16:
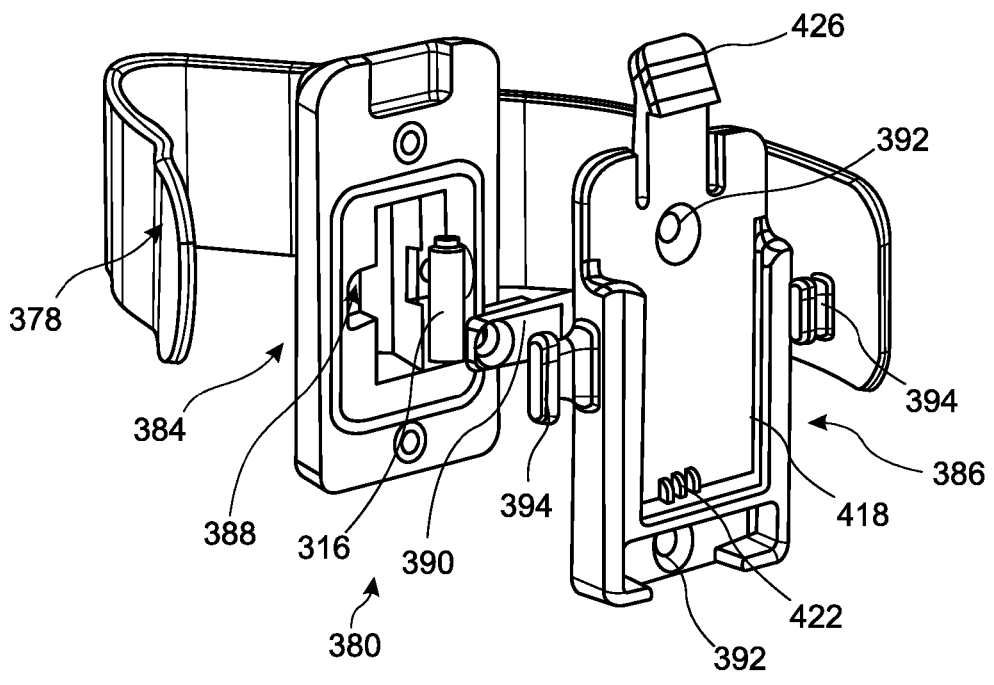

As shown most clearly in FIG. 16 of the accompanying drawings, the vibration generation module 380 comprises a generator housing 384 and a cover portion 386, which also acts to facilitate coupling of the vibration generation module 380 and controller module 382. While in the illustrated vibration generation module 380, the cover portion 386 acts as both a cover and a coupler, it will be recognised that the covering and coupling functions may be achieved using separate elements.

The generator housing 384 comprises a recess 388 for receiving a vibration source 316. In the illustrated vibration generation arrangement 312, the vibration source 316 takes the form of a vibration motor and in particular a coreless cylindrical type vibration motor. The vibration source 316 is secured in place with a retainer 390.

The cover portion 386 is secured to the generator housing 384 via fasteners (not shown) extending through bores 392 in the cover portion 386 and into the generator housing 384.

In the illustrated vibration generation module 380, the cover portion 386 has laterally extending boss portions 394 that extend through eyes 396 (shown most clearly in FIGS. 13, 14 and 15) in the strap 378, thereby facilitating coupling of the vibration generation module 380 to the strap 378.

The controller module 382 comprises a controller housing 398 and a cover portion 400, which also acts to facilitate coupling of the controller module 382 and the vibration generation module 380. While in the illustrated controller module 382, the cover portion 400 acts as both a cover and a coupler, it will be recognised that the covering and coupling functions may be achieved using separate elements.

The controller housing 398 houses, amongst other things, PCB 402 and onboard power supply 318.

Figure 13:
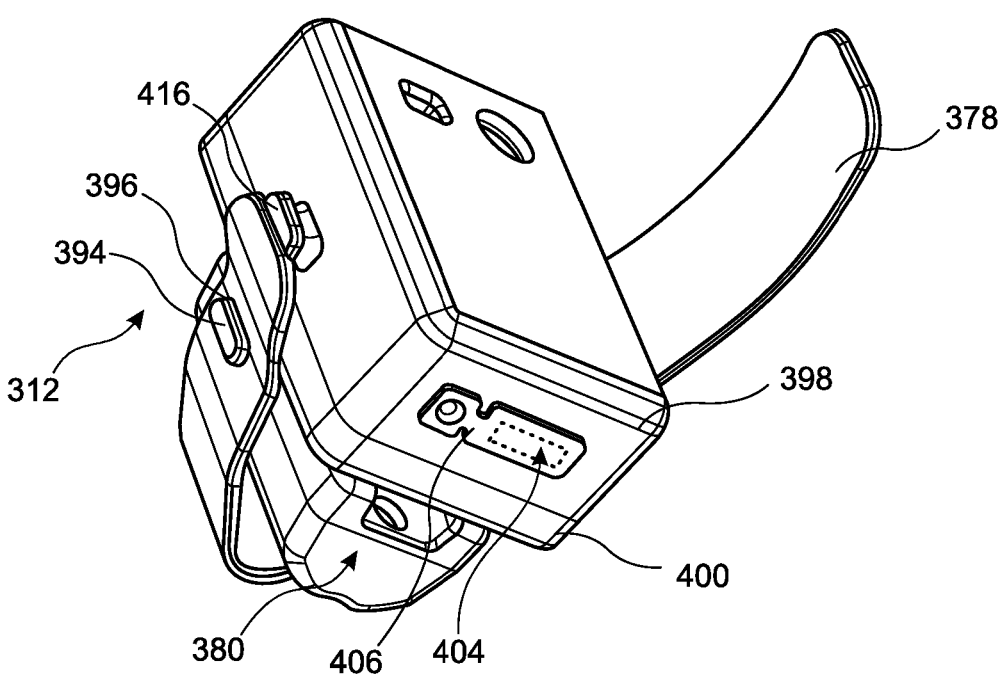
FIGS. 13 to 17 show a further alternative vibration generation arrangement to that shown in FIG. 1.

As shown in FIG. 13, the controller housing 398 comprises a data communication and/or power charging port 404 (shown in dotted lines, which in the illustrated takes the form of a USB port. The data communication and/or power charging port 404 is protected by a cover 406.

Figure 14:
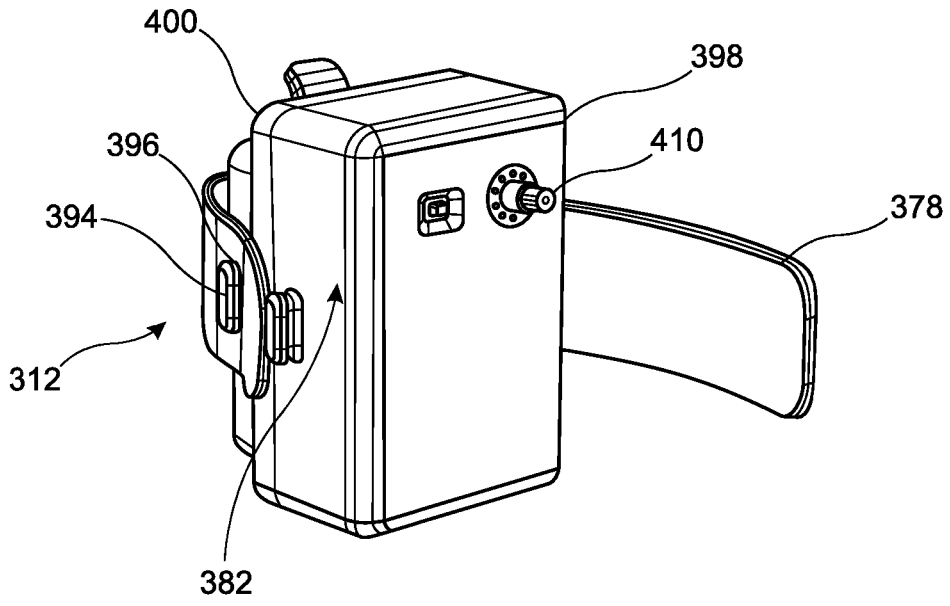
Figure 15:
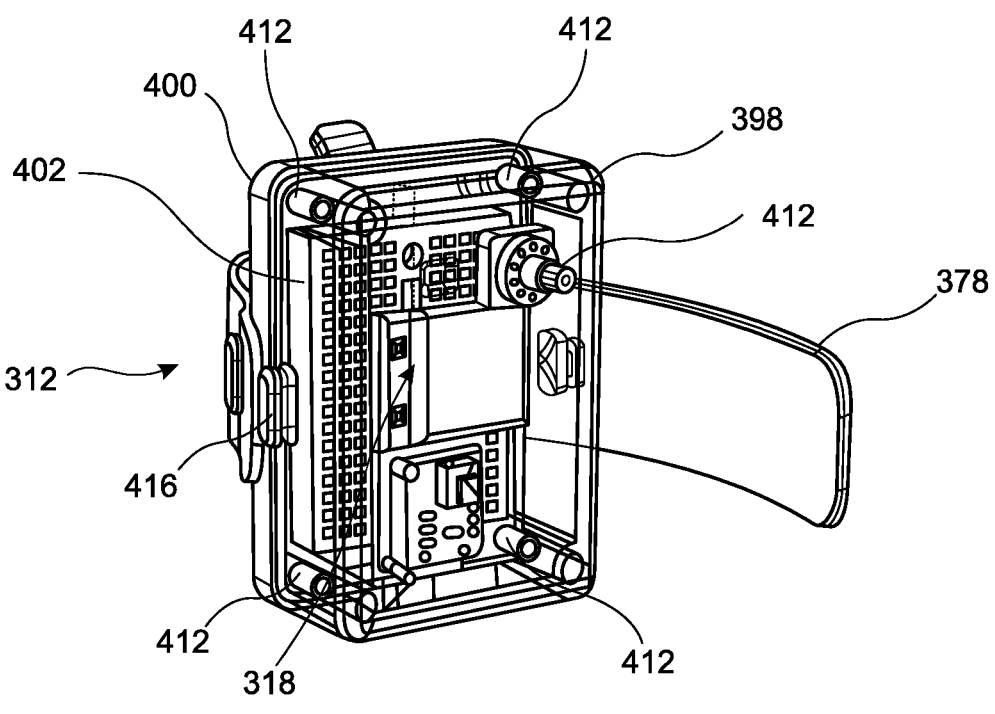

As shown in FIGS. 14 and 15 of the accompanying drawings, the controller module 382 further comprises a control knob 410 that permits manual adjustment of the identification signal produced by the vibration generation arrangement 312. However, it will be understood that the controller module 382 may be remotely operable and/or adjustable, for example via the communication arrangement.

Figure 17:
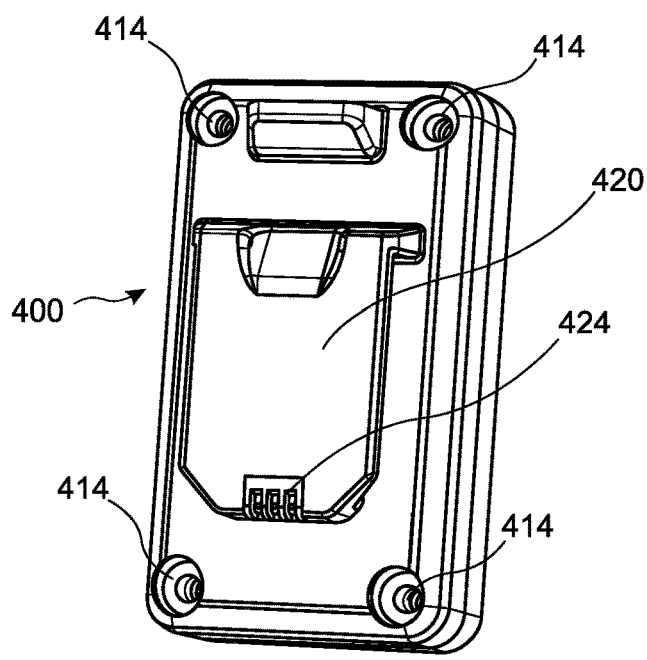

With reference to FIGS. 15 and 17, the cover portion 400 is secured to the controller housing 398 via fasteners 412 extending through bores 414 in the cover portion 400 and into the controller housing 398.

As shown, the controller housing 398 has laterally extending boss portions 416 that are capable of passing through the eyes 396 in the strap 378. This permits the strap 378 to be adjusted to the size of the first pipe section P1.

As described above, the vibration generation module 380 and controller module 382 are configured to be coupled together, and more particularly the vibration generation module 380 and the controller module 382 are configured so that the controller module 382 docks into, latches with and makes an electrical connection with the vibration generation module 380.

With reference in particular to FIGS. 16 and 17, it can be seen that in the illustrated vibration generation arrangement 312 the cover portion 386 defines a receiver 418 in the form of a slot. The receiver 418 is configured (dimensioned and positioned) to receive a docking flap 420 formed on the cover portion 400. As shown in FIG. 16, electrical contacts 422, 424 are provided in the cover portions 386, 400 to facilitate electrical connection between the controller module 382 and the vibration generation module 380. The docking flap 420 thus both facilitates the secure coupling of the controller module 382 and the vibration generation module 380 and provides the electrical connection between the controller module 382 and the vibration generation module 380.

As shown in FIG. 16, and with reference also to FIGS. 14 and 15, the cover portion 386 further comprises a snap fit connector 426 which, when the cover portion 400 is engaged with the cover portion 386, snaps over the cover portion 400. The snap fit connector 426 acts to retain the engagement between the controller module 382 and the vibration generation module 380 and in particular the electrical connection between the electrical contacts 422, 424.

Figure 18:
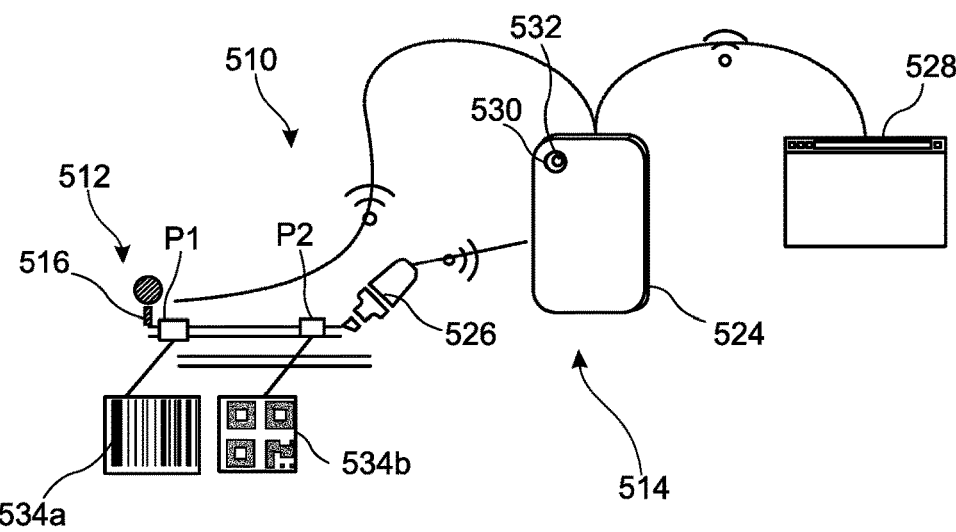
FIG. 18 shows an alternative system for identifying a pipe and/or associated component parts of a piping system.

As described above, various modifications may be made without departing from the scope of the claimed invention. For example, FIG. 18 shows an alternative system, generally denoted 510, for identifying a pipe and/or associated component parts of a piping system, for example to facilitate its repair, maintenance and/or replacement. As shown in FIG. 18, the system 510 comprises a vibration generation arrangement 512 comprising a vibration source 516 and a vibration detection arrangement 514. The vibration generation arrangement 512 is configured for engagement with, for coupling to and/or operatively associated with a first pipe section P1, and is configured to generate a vibration in the first pipe section P1 when brought into contact with the first pipe section P1. In use, the vibration generation arrangement 512 generates a vibration in a first pipe section P1 which propagates along the pipe. The vibration detection arrangement 514 is configured to detect vibration in second pipe section P2 distal to the first pipe section P1 so that it can be determined if the second pipe section P2 forms part of the same pipe or pipe assembly as the first pipe section P1.

The vibration detection arrangement 514 comprises a mobile device 524 and a probe 526 coupled to the mobile device 524. In the illustrated system 510, the vibration generation arrangement 512 and probe 526 are wirelessly coupled to the mobile device 524. The mobile device wirelessly communicates with a remote data store 528.

As shown in FIG. 18, the system 510 comprises a camera 530, which in the illustrated system 510 takes the form of a digital camera comprising a CMOS sensor 532, although it will be understood that any suitable camera may be utilised. In use, image data from the camera 530 may be combined with the sensor data obtained from the sensor arrangement (not shown).

As shown in FIG. 18, the system 510 comprises one or more tags 534a,534b for attachment to the first pipe section P1 and/or the second pipe section P2. The tags 534a,534b comprise a machine readable code, such as a barcode or QR code.

While in the above described vibration generation arrangements 12, 112, 212, 312, 512 the vibration sources 16, 116, 216, 316, 516 comprise or takes the form of a vibration motor, it will be understood that other suitable means for generating vibration may be utilised.

Figure 19:
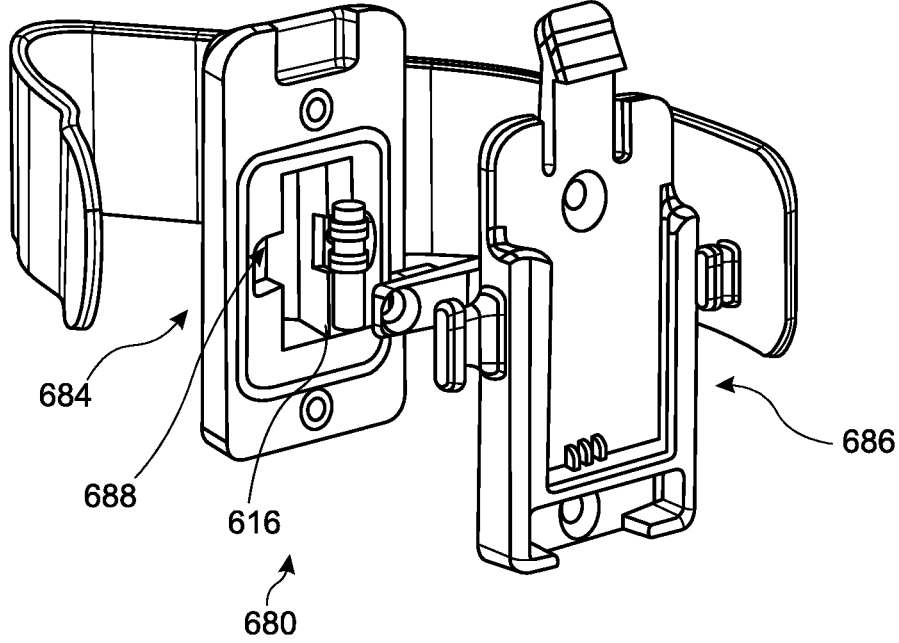
FIG. 19 shows an alternative vibration generation module to that shown in FIG. 16.

For example, FIG. 19 of the accompanying drawings shows an alternative vibration generation module 680. As shown in FIG. 19, vibration generation module 680 comprises a generator housing 684 and a cover portion 686. The generator housing 684 comprises a recess 688 for receiving a vibration source 616, which in the illustrated vibration generation arrangement takes the form of a sonic and/or ultrasonic guided wave generator and/or amplitude modulation generator used to produce amplitude modulated sine bursts.

The invention claimed is:

1. A system for identifying a pipe and/or associated component parts of a piping system, comprising:
   a vibration generation arrangement configured for engagement with, for coupling to and/or operatively associated with a first pipe section, the vibration generation arrangement configured to generate a vibration in the first pipe section, said vibration forming an identification signal propagating along the pipe; and
   a vibration detection arrangement configured for engagement with, for coupling to and/or operatively associated with a second pipe section, the vibration detection arrangement configured to detect vibration in the second pipe section and thus identify whether the second pipe section and the first pipe section form part of the same pipe or pipe assembly,
   wherein:
      the vibration detection arrangement is configured to detect a pre-existing or background vibration in the second pipe section, and
      the vibration generation arrangement is configured to modify the vibration forming the identification signal in response to the detected pre-existing or background vibration in the second pipe section.

2. The system of claim 1, wherein the system comprises, is coupled to, or is operatively associated with a camera.

3. The system of claim 1, wherein the system is configured for use in identifying a subsea pipe and/or associated component parts of a subsea piping system.

4. The system of claim 1, comprising a position sensing arrangement.

5. The system of claim 1, wherein the vibration generation arrangement comprises a vibration source, and wherein optionally the vibration source comprises or takes the form of:
   one or more vibration motors;
   one or more sonic and/or ultrasonic guided wave generator; and/or
   amplitude modulation generator.

6. The system of claim 5, comprising an applicator coupled to or operatively associated with the vibration source, wherein the applicator is configured to contact the pipe to apply the vibration generated by the vibration source to the pipe.

7. The system of claim 1, wherein the vibration generation arrangement comprises or takes the form of a handheld device.

8. The system of claim 1, comprising:
   a securement arrangement configured to secure the vibration generation arrangement to the pipe and/or bring the vibration generation arrangement into contact with the pipe; and/or
   a securement arrangement configured to secure the vibration detection arrangement to the pipe and/or bring the vibration detection arrangement into contact with the pipe.

9. The system of claim 1, wherein at least one of:
   the vibration generation arrangement is oriented in a plane which is transverse to the longitudinal axis of the pipe;
   the vibration generation arrangement extends radially with respect to the pipe;
   the vibration generation arrangement is oriented perpendicular or at another non-zero angle with respect to a longitudinal axis of the pipe;
   the vibration generation arrangement is oriented across the pipe;
   the vibration generation arrangement is oriented parallel to the longitudinal axis of the pipe; and
   the vibration generation arrangement is oriented along the length of the pipe.

10. The system of claim 1, wherein the vibration generation arrangement is configured to generate a vibration with a predetermined profile.

11. The system of claim 1, comprising a sensor arrangement comprising at least one of:
   one or more temperature sensor;
   one or more sensor configured to detect whether the first pipe section contains pressurised contents;
   one or more sensor configured to detect whether the contents of the first pipe section are flowing or static; and one or more sensor configured to detect whether fluid contained in the pipe assembly is a gas or liquid.

12. The system of claim 1, wherein at least one of:

the vibration detection arrangement comprises or takes the form of a vibration meter;

the vibration detection arrangement comprises or takes the form of a mobile device having vibration metering application software;

the vibration detection arrangement comprises a probe, wherein the probe comprises a sensor arrangement comprising one or more sensor configured to detect vibration; and the vibration detection arrangement comprises or takes the form of a handheld device.

13. The system of claim 1, wherein the system is configured to display the vibration detected by the vibration detection arrangement, the vibration detection arrangement comprising a visual display unit.

14. The system of claim 1, comprising a wired and/or wireless communication arrangement configured to communicate the vibration detected by the vibration detection arrangement to one or more remote location, the remote location for example comprising or taking the form of one or more of: a mobile device; a control room; and a data store.

15. The system of claim 14, wherein the communication arrangement comprises or takes the form of a two-way communication arrangement.

16. The system of claim 1, wherein the system comprises, is coupled to or is operatively associated with a processing system configured to determine whether said detected vibration corresponds to the vibration generated by the vibration generation arrangement, and wherein optionally the system is configured to compare the vibration data from two or more preselected times or time intervals, the processing system configured to compare the vibration data from said two or more of said preselected times or time intervals.

17. The system of claim 1, wherein at least part of the system is remotely activatable.

18. A method for identifying a pipe and/or associated component parts of a piping system, comprising:

(i) detecting a pre-existing or background vibration in a second pipe section;

(ii) generating a vibration in a first pipe section using a vibration generation arrangement, said vibration forming an identification signal propagating along the pipe, and the identification signal being modified in response to the detected pre-existing or background vibration in the second pipe section in step (i); and (iii) detecting the vibration in a second pipe section using a vibration detection arrangement, and thus identify whether the second pipe section and the first pipe section form part of the same pipe or pipe assembly.

19. A processing system, computer program product and/or carrier medium configured to implement the method of claim 18, wherein the computer program product is configured such that when processed by the processing system the computer program product configures the processing system to implement the method, and wherein the carrier medium comprises a signal, the signal when processed by the processing system causing the processing system to implement the method.

20. A system for identifying the integrity of a pipe or pipe assembly, comprising:

a vibration generation arrangement configured for engagement with, for coupling to and/or operatively associated with a first pipe section of a pipe or pipe assembly, the vibration generation arrangement configured to generate a vibration in the first pipe section, said vibration forming an identification signal propagating along the pipe; and a vibration detection arrangement configured for engagement with, for coupling to and/or operatively associated with a second pipe section of said pipe or pipe assembly, the vibration detection arrangement configured to detect vibration in the second pipe section, wherein the absence of said vibration identifies a lack of integrity between the first pipe section and the second pipe section, wherein:

the vibration detection arrangement is configured to detect a pre-existing or background vibration in the second pipe section, and the vibration generation arrangement is configured to modify the vibration forming the identification signal in response to the detected pre-existing or background vibration in the second pipe section.

21. A method for identifying the integrity of a pipe or pipe assembly, comprising:

(i) detecting a pre-existing or background vibration in a second pipe section;

(ii) generating a vibration in a first pipe section of a pipe or pipe assembly using a vibration generation arrangement, said vibration forming an identification signal propagating along the pipe, and the identification signal being modified in response to the detected pre-existing or background vibration in the second pipe section in step (i); and (ii) detecting the vibration in a second pipe section of said pipe or pipe assembly using a vibration detection arrangement, wherein the absence of said vibration identifies a lack of integrity between the first pipe section and the second pipe section.

22. A processing system, computer program product and/or carrier medium configured to implement the method of claim 21, wherein the computer program product is configured such that when processed by the processing system the computer program product configures the processing system to implement the method, and wherein the carrier medium comprises a signal, the signal when processed by the processing system causing the processing system to implement the method.

* * * * *